US010027879B2

(12) United States Patent
Passarella et al.

(10) Patent No.: US 10,027,879 B2
(45) Date of Patent: Jul. 17, 2018

(54) DEVICE, SYSTEM AND METHOD TO PROVIDE AN AUTO-FOCUS CAPABILITY BASED ON OBJECT DISTANCE INFORMATION

(71) Applicant: GOOGLE LLC, Mountain View, CA (US)

(72) Inventors: Katrina Passarella, San Francisco, CA (US); Vlad Cardei, Redwood City, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/352,503

(22) Filed: Nov. 15, 2016

(65) Prior Publication Data

US 2018/0139376 A1    May 17, 2018

(51) Int. Cl.
| | | |
|---|---|---|
| H04N 5/232 | (2006.01) | |
| H04N 5/225 | (2006.01) | |
| G06T 7/00 | (2017.01) | |
| G03B 13/36 | (2006.01) | |

(52) U.S. Cl.
CPC ......... *H04N 5/23212* (2013.01); *G03B 13/36* (2013.01); *G06T 7/004* (2013.01); *H04N 5/2253* (2013.01); *H04N 5/2254* (2013.01)

(58) Field of Classification Search
CPC .................. H04N 5/23212; H04N 5/23219
USPC .... 348/208.3, 345, 352, 355, 356, 361, 363; 396/79–83, 89–152
See application file for complete search history.

(56) References Cited

U.S. PATENT DOCUMENTS

| | | |
|---|---|---|
| 4,639,110 A | 1/1987 | Rinn et al. |
| 5,091,742 A | 2/1992 | Fukahori et al. |
| 5,532,782 A | 7/1996 | Mori et al. |
| 5,978,149 A | 11/1999 | Hashimura et al. |
| 8,655,162 B2 | 2/2014 | Mick et al. |

(Continued)

FOREIGN PATENT DOCUMENTS

| | | |
|---|---|---|
| GB | 2196134 | 4/1988 |
| GB | 2241069 | 8/1991 |

(Continued)

OTHER PUBLICATIONS

International Search Report and Written Opinion issued in International Application No. PCT/US2017/043017, dated Oct. 9, 2017, 15 pages.

(Continued)

*Primary Examiner* — Xi Wang
(74) *Attorney, Agent, or Firm* — Fish & Richardson P.C.

(57) ABSTRACT

Techniques and mechanisms for determining a configuration of the lens system. In an embodiment, respective distances from a reference are determined for each of a plurality of objects that are observable via the lens system. Based on the object distances, counts of in-focus objects are determined, each for a corresponding focal configuration of the lens system. Each such count of in-focus objects represents a total number of objects that are (or would be) in focus during the corresponding focal configuration, wherein a respective one of the plurality of objects is at a near depth of field of the corresponding focal configuration. In another embodiment, a preference of one focal configuration over another focal configuration is determined based on the counts of in-focus objects.

22 Claims, 5 Drawing Sheets

(56) References Cited

U.S. PATENT DOCUMENTS

| | | | |
|---|---|---|---|
| 9,065,993 | B1 | 6/2015 | Mao et al. |
| 9,100,569 | B2 | 8/2015 | Lin et al. |
| 2005/0191047 | A1* | 9/2005 | Toji ................. G02B 7/102 396/111 |
| 2007/0019104 | A1* | 1/2007 | Inoue ............... H04N 5/23212 348/345 |
| 2007/0153112 | A1* | 7/2007 | Ueda ................ G03B 19/12 348/335 |
| 2008/0170847 | A1* | 7/2008 | Flannery ............ G03B 7/14 396/222 |
| 2009/0015681 | A1 | 1/2009 | Pipkorn |
| 2011/0002680 | A1* | 1/2011 | Narasimha .......... G03B 3/00 396/124 |
| 2011/0142287 | A1* | 6/2011 | Wong ................ G06T 7/571 382/106 |
| 2014/0362275 | A1* | 12/2014 | Brunner ............. H04N 5/23212 348/349 |
| 2015/0116577 | A1 | 4/2015 | Lin et al. |

FOREIGN PATENT DOCUMENTS

| | | |
|---|---|---|
| JP | 2014235224 | 12/2014 |
| WO | WO 2009/007860 | 1/2009 |

OTHER PUBLICATIONS

Written Opinion issued in International Application No. PCT/US2017/043017, dated Jan. 30, 2018, 5 pages.
Great Britain Search and Examination Report issued in British Application No. GB1715163.0, dated Mar. 1, 2018, 5 pages.

\* cited by examiner

DEVICE, SYSTEM AND METHOD TO PROVIDE AN AUTO-FOCUS CAPABILITY BASED ON OBJECT DISTANCE INFORMATION

BACKGROUND

1. Technical Field

This disclosure relates generally to the field of optics and in particular, but not exclusively, relates to operation of an image sensor with a variable focus lens system.

2. Background Art

In optics, the depth of field ("DOF") is the range in a scene between a nearer distance and a further distance, between which distances objects in the image can appear to be acceptably sharp. A fixed-focus lens can only precisely focus on a single depth within a scene, as such sharpness gradually decreases on either side of this focus distance. Objects that fall within the depth of field are considered to have acceptable sharpness.

Digital imaging devices, such as digital cameras, often include a lens assembly that focuses image light onto an image sensor that measures the image light and generates an image based on the measurements. A variable focus lens can adjust its focus distance, such that it can be focused at different distances at different times. This enables the imaging device to translate the depth of field to focus on objects at any of a variety of distances. Conventional imaging devices often support auto-focus functionality to facilitate the changing of focal distance. As the number and variety of form factors for imaging devices continue to grow over time, there is expected to be an increased demand for solutions that provide responsive and/or otherwise efficient auto-focus functionality.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
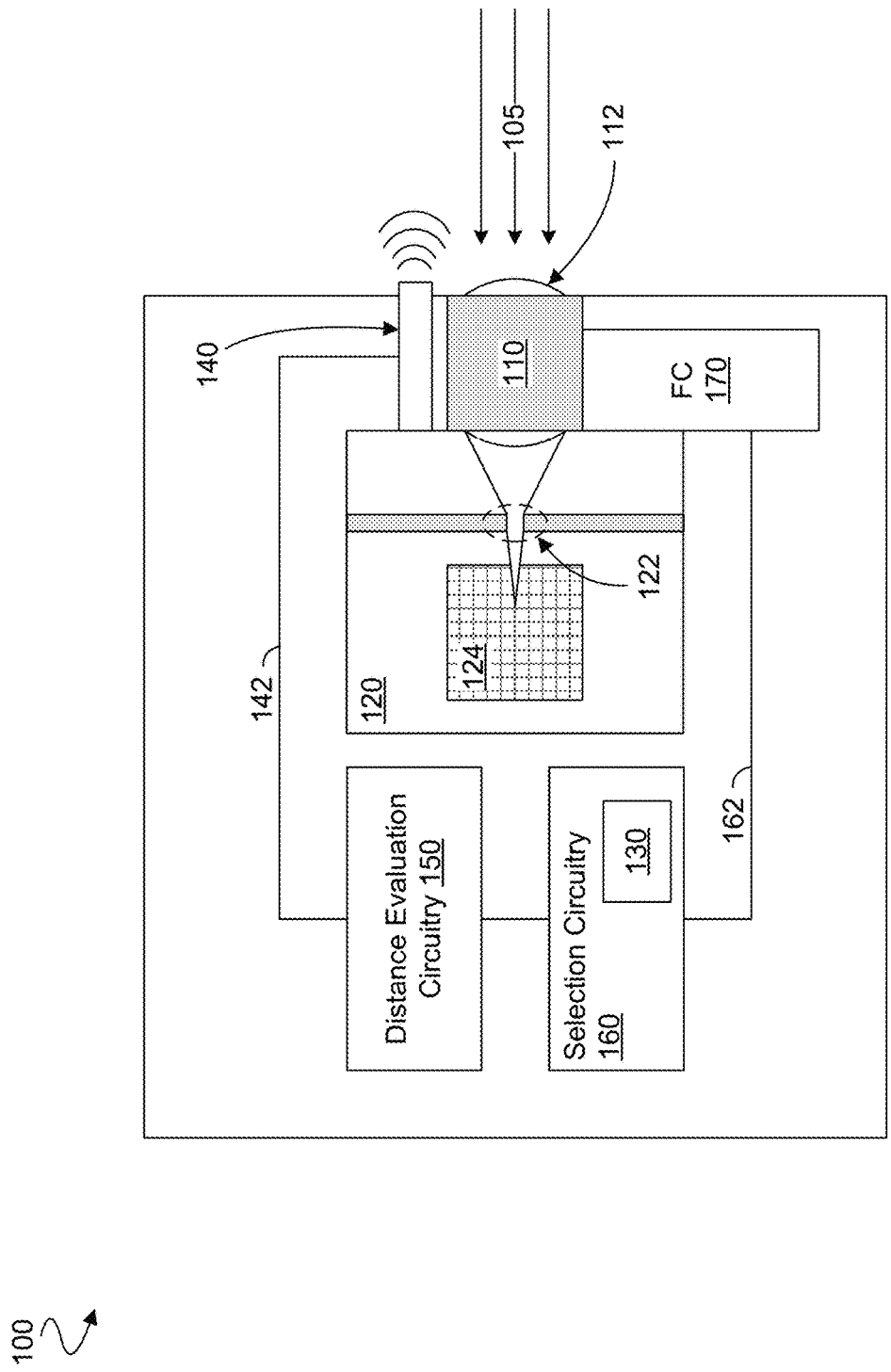
FIG. 1 is a functional block diagram illustrating elements of a system to determine a focal configuration according to an embodiment.

Embodiments described herein variously provide techniques and mechanisms for determining a type of focus to be provided with a lens system. Such a lens system may be configured, in some embodiments, based on an evaluation of whether objects observable through the lens system might be variously in-focus or out-of-focus—e.g., given a particular aperture and/or other operational characteristic of an image sensor that is optically coupled to the lens system. Where it is determined that one lens system configuration results in (or would result in) more objects being in-focus, as compared to another lens system configuration, a signal may be generated, according to an embodiment, to indicate a relative preference of the one lens system configuration over the other lens system configuration.

In the following description numerous specific details are set forth to provide a thorough understanding of the embodiments. One skilled in the relevant art will recognize, however, that the techniques described herein may be practiced without one or more of the specific details, or with other methods, components, materials, etc. In other instances, well-known structures, materials, or operations are not shown or described in detail to avoid obscuring certain aspects. Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some conventional digital imaging, if there is only one subject in a scene, an auto focus (AF) algorithm typically adjusts a lens position to set a focal distance on that one subject. Some embodiments are based on a realization by the inventors that, in some circumstances, this approach may be less than optimal for scenes with several objects, such as human faces, located at various distances. Such embodiments variously improve on conventional auto-focus techniques by providing mechanisms which recognize that one field of focus, as compared to another field of focus, may result in a greater number and/or better arrangement of in-focus objects.

As used herein, "field of view" refers to the portion of an environment that is observable through a lens system. A field of view may refer, for example, to that portion of a three-dimensional environment, the image of which may be captured as a two-dimensional image via a particular lens system directed at the portion. The term "field of focus" (also "focus field" or "focal field") refers to that portion of the field of view in which an object or objects, as observed through the lens system, will be sufficiently in-focus, according to some pre-determined criteria. A given field of focus—which may depend in part on a given aperture of the imaging system, for example—comprises a respective focal distance and a respective depth of field.

A "focal distance" is a distance from some reference point (e.g., a center of a lens of the lens system) to the center of the focal field. A "depth of field" is a total depth of the field of focus (e.g., as measured along a line of direction extending to/from the reference point). The depth of field, which is also known as "focus range," extends between a near depth of field and a far depth of field. The term "near depth of field" refers to a distance to a nearest edge of the depth of field, as measured from a reference point such as a center of a lens of the lens system. Similarly, "far depth of field" refers herein to a distance from the reference point to a farthest edge of the depth of field.

For many optical systems, the relationship between focal distance(s) and near depth of field (Dn) can—for example—be generally represented by the following equation:

$$s \approx (Dn*H)/(H-Dn) \text{ for } Dn<H, \qquad (1)$$

where the hyperfocal distance (H) is a closest distance at which a lens system can be focused while keeping objects at infinity acceptably sharp. Typically, when the lens is focused at the hyperfocal distance, all objects at distances from half of the hyperfocal distance out to infinity will be acceptably sharp. The hyperfocal distance of an imaging system may be different for different settings (e.g., different apertures) of that imaging system.

The relationship between Dn, s and H may also be generally represented by the following equations:

$$Dn \approx (Hs)/(H+s) \text{ for } s<H, \qquad (2)$$

$$Dn \approx H/2 \text{ for } s \geq H, \qquad (3)$$

and the relationship between far depth of field (Df), s and H may be generally represented by the following equations:

$$Df \approx (Hs)/(H-s) \text{ for } s<H, \qquad (4)$$

$$Df \approx \infty \text{ for } s \geq H. \qquad (5)$$

However, any of a variety of additional or alternative criteria—e.g., including one or more equations adapted from conventional imaging techniques—may be used for identifying relationships between various ones of Dn, Df, H and s.

The phrase "focal configuration" refers herein to a given configuration of a lens system—e.g., one of multiple possible configurations—that is to facilitate the providing of a corresponding field of focus. The field of focus may be that of the lens system on its own. Alternatively, the field of focus may be an overall field of focus provided by the lens system in combination with one or more other devices (e.g., including another one or more lenses, a particular aperture structure, circuitry to execute image focus software and/or the like).

Embodiments described herein variously determine—e.g., automatically—a relative preference of one focal configuration over another focal configuration, where such determining is based on an evaluation of an object or objects that might be in a field of focus. Unless otherwise indicated, "identified object" or "identified objects" variously refer herein to one or more objects that are in a field of view of a lens system and that have each been identified (e.g., including being distinguished from one another) as having a respective distance from some reference such as a point located in or on a lens system. Such one or more objects may include only a subset of a larger plurality of objects observable through the lens system (e.g., where the subset includes only objects which each take up at least some minimum portion of the field of view).

As used herein, an "in-focus object set" refers to a set of those one or more identified objects which are, or would be, in-focus as observed with the lens system during a particular focal configuration thereof. Various focal configurations of the lens system may thus correspond to different respective in-focus object sets. Of the one or more objects in a given in-focus object set, an object that is closest to the lens system may be referred to as a "nearest in-focus object," whereas an object that is farthest from the lens system is referred to as a "farthest in-focus object." Accordingly, various in-focus object sets may comprise different respective nearest in-focus objects and/or farthest in-focus objects. A "count of in-focus objects" (for brevity, also referred to herein as "object count") refers herein to a total number of the one or more objects in an in-focus object set.

FIG. 1 illustrates elements of a system 100, according to an embodiment, to determine a focal configuration to be implemented for use in an image capture operation. System 100 is just one example of an embodiment configured to determine, based on respective distances of objects that are within a field of view, a preference of one focal configuration over another focal configuration. Such a preference may be determined, for example, based on scores calculated each for a respective one of the focal configurations. The scores may each be equal to, or otherwise based on, a respective count of in-focus objects that is associated with a corresponding field of focus.

In the illustrative embodiment shown, system 100 includes a lens system 110 comprising one or more lenses—such as the illustrative lens 112 shown—to receive light 105 from an external environment. Lens system 110 may include any of a variety of optical devices that accommodate an adjustable focus capability. Such an optical device may be controlled, based on techniques described herein, using one or more focus-adjustment mechanisms adapted from conventional auto-focus technology.

Lens system 110 may be optically coupled to direct light 105 from the external environment toward an image sensor 120 of system 100—e.g., wherein light output by lens system 110 is focused through an aperture 122 onto a pixel array 124. Pixel array of 124 may include complementary metal-oxide-semiconductor (CMOS) pixels and/or any of a variety of other pixels adapted from conventional image sensing techniques. Some embodiments not limited to a particular pixel array architecture for use in generating image data based on light 105. In some embodiments, a configuration of lens system 110 is to be determined given a particular size of aperture 122—e.g., wherein image sensor 120 is a fixed aperture device or wherein one focal configuration is to be selected from a plurality of possible focal configurations for use in combination with a particular size of aperture 122.

For example, system 100 may further comprise a distance sensor 140 configured to operate as a range-finder for detecting objects in a field of view which is observable with lens system 110. Detection of object distances with distance sensor 140 may include one or more operations adapted from conventional range-finding techniques, which are not detailed herein to avoid obscuring features of various embodiments. By way of illustration and not limitation, distance sensor 140 may provide functionality of a laser rangefinder, ultrasonic rangefinder or infrared rangefinder. Other means for range-finding are possible, such as light detection and ranging (LIDAR), radio detection and ranging (RADAR), microwave range-finding, etc.

Distance sensor 140 may be coupled to output signals 142 to distance evaluation circuitry 150 of system 100. Distance evaluation circuitry 150 may comprise logic—e.g., including an application specific integrated circuit (ASIC), processor circuitry, state machine and/or other semiconductor hardware—configured to detect, based on signals 142, that multiple objects are in a field of view observable through lens system 110. Some or all such objects may be distinguishable from one another by different respective distances from system 100.

Range-finding with distance sensor 140 and distance evaluation circuitry 150 may include active detection techniques, passive detection techniques (e.g., including phase detection, contrast measurement and/or the like) or a combination thereof. In one embodiment, distance evaluation circuitry 150 may identify, for each object of a plurality of objects, a respective distance to that object relative to some reference location in or on system 100. This identification may be based, for example, on a threshold response to a laser and/or other range-finding signal output from distance sensor 140. Such a minimum threshold response may limit the identified plurality of objects to those objects which each occupy at least some minimum threshold amount of the field of view. Alternatively or in addition, such a minimum threshold response may limit the identified plurality of objects to those objects in the field of view which are within some maximum threshold distance from system 100.

Although some embodiments are not limited in this regard, distance sensor 140 may provide directional range-finding functionality which identifies, for different respective portions of the field of view, a distance to a respective object, at least part of which occupies that portion of the field of view. For example, distance sensor 140 may be operated to sequentially (or otherwise) sweep the field of view, where corresponding response signals, received by distance sensor 140 in sequence, are thus associated each with a different respective portion of the field of view. In such an embodiment, distance evaluation circuitry 150 may correspond various object distances each with a different respective portion of the field of view.

System 100 may further comprise selection circuitry 160 coupled to receive from distance evaluation circuitry 150 information that specifies or otherwise indicates the respective distances of the plurality of objects from system 100. Selection circuitry 160 may comprise logic—e.g., including an ASIC, processor circuitry and/or the like—to determine, based on such object distances, a focal configuration to implement with lens system 110. Such determining may include selection circuitry 160 identifying a relative preference of some first focal configuration over a second focal configuration. This preference may be based, for example, on a determination that the first focal configuration would, as compared to the second focal configuration, result in a larger number and/or better arrangement (indicated by some score or other metric) of in-focus objects.

In one illustrative embodiment, selection circuitry 160 includes or otherwise has access to reference information which describes one or more relationships between a focal distance(s), near depth of field (Dn), far depth of field (Df), hyperfocal distance (H) and/or any of various other optical characteristics to be provided with lens system 100. By way of illustration and not limitation, selection circuitry 160 may comprise or be coupled to a memory 130 which is preprogrammed with such reference information—e.g., by a manufacturer, retailer, computer network service or other agent. Based on object distance data from distance evaluation circuitry 150, selection circuitry 160 may access reference information at memory 130 to select, calculate and/or otherwise determine, for a given distance of one such object, a total number of objects that are (or would be) in focus during a corresponding focal configuration of lens system 110. For example, the focal configuration may correspond to the object in question being located at a near depth of field to be provided with lens system 110.

Based on an evaluation of multiple possible focal configurations, selection circuitry 160 may output a signal 162 which identifies or otherwise indicates a focal configuration that has been determined to be preferred over at least one alternative focal configuration. In response to signal 162, a focus controller (FC) 170 of system 100 may adjust or otherwise configure a field of focus to be implemented with lens system 110. FC 170 may include any of a variety of one or more hardware and/or software mechanisms to change an effective focal distance provided with lens system 110. By way of illustration and not limitation, FC 170 may include a motor to move lenses of lens system 110 relative to one another and/or relative to pixel array 124. Alternatively or in addition, FC 170 may include logic (e.g., including an ASIC, processor, executing software and/or the like) that, for example, is to implement at least in part an effective field of focus by way of image processing calculations. Based on signal 162, FC 170 may implement a focal configuration that provides a particular depth of field with lens system 110. During such a focal configuration, image sensor 120 may be operated—e.g., responsive to selection circuitry 160 and/or FC 170—to capture an image of the external environment.

Although some embodiments are not limited in this regard, distance evaluation circuitry 150 may further include or be coupled to image recognition circuitry (not shown) that is configured to receive and process image information generated by pixel array 124 based on light received via lens system 110. Such image recognition circuitry may, for example, be preprogrammed with (or otherwise have access to) other reference information describing of one or more classes of objects. Based on such other reference information, the image recognition circuitry may evaluate signals from pixel array 124 to determine whether any region of the field of view includes a representation of some object belonging to a predefined object class. Some examples of an object classes include, but are not limited to, an eye class, mouth class, head class, automobile class, building class and/or the like. Identification of one or more objects of an object class may include operations adapted from conventional image recognition techniques. In an embodiment, one or more object distances variously indicated by signals 142 may each be associated with a respective object that is identified as belonging to a corresponding object class.

Figure 2:
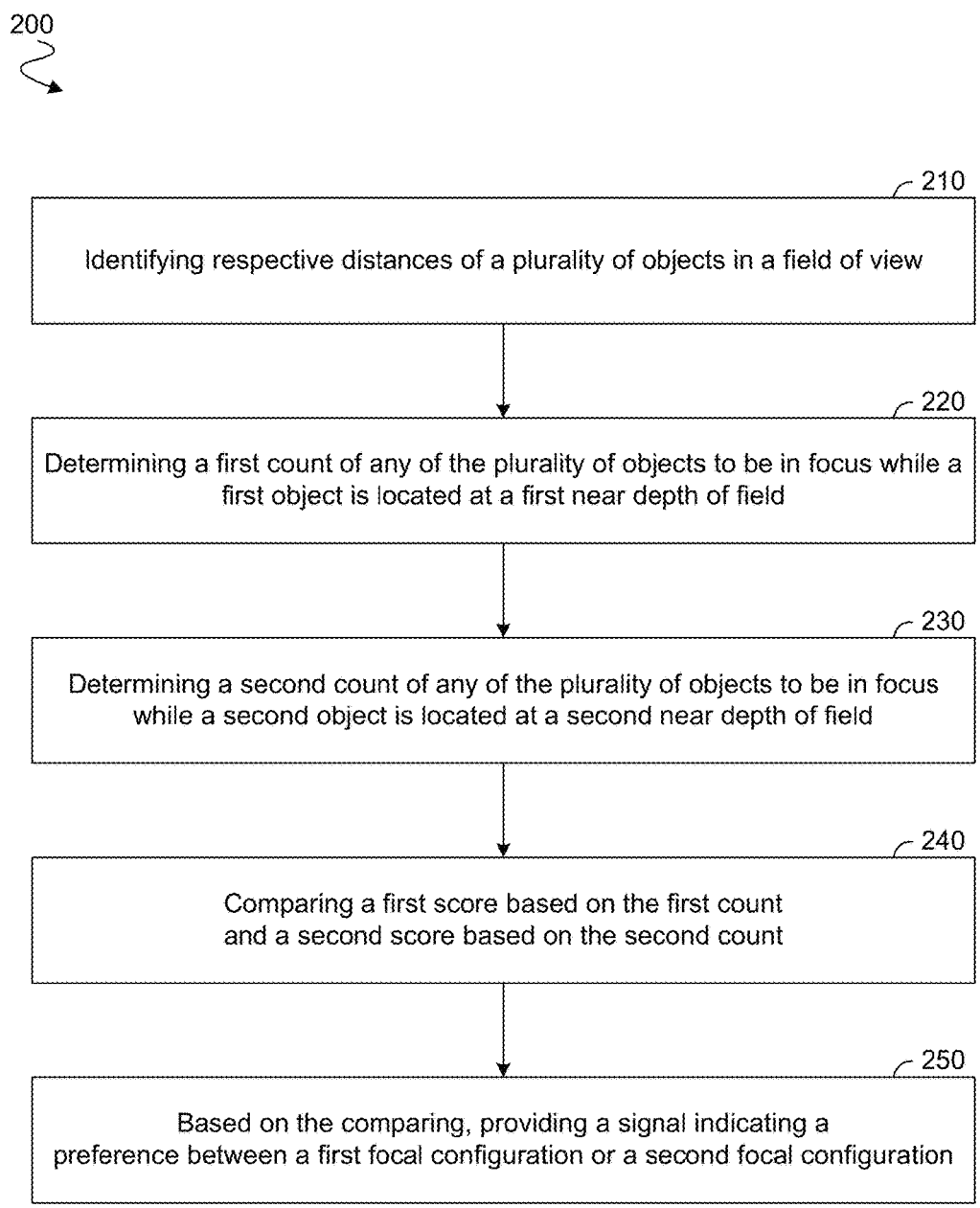
FIG. 2 is a flow diagram illustrating elements of a method for operating an image sensor device according to an embodiment.
Figure 3A:
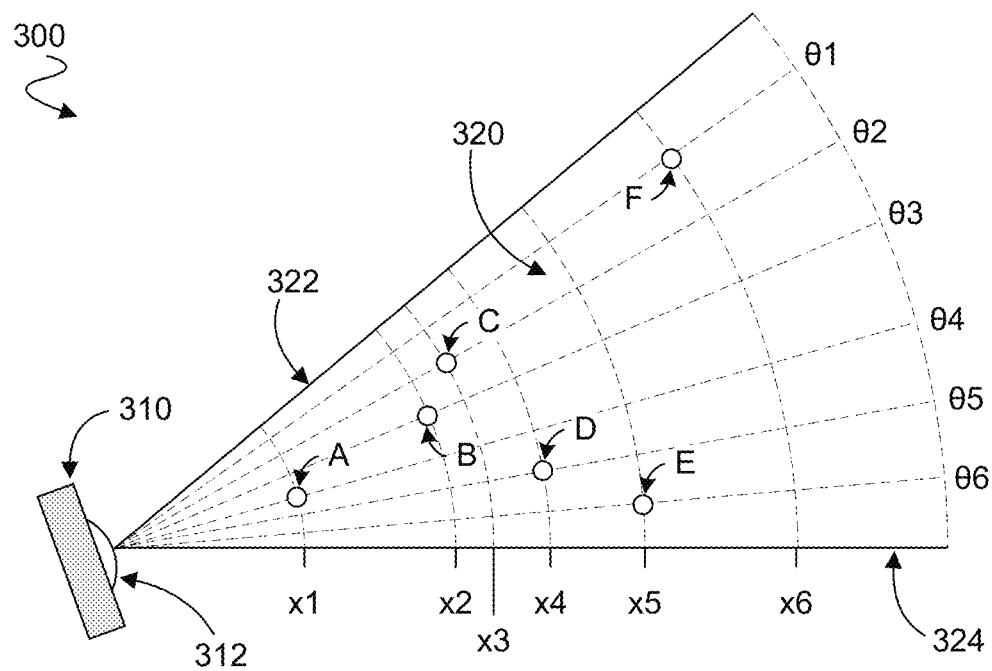
FIG. 3A is a plan view of an environment including a device to provide auto-focus capability according to an embodiment.
Figure 3B:
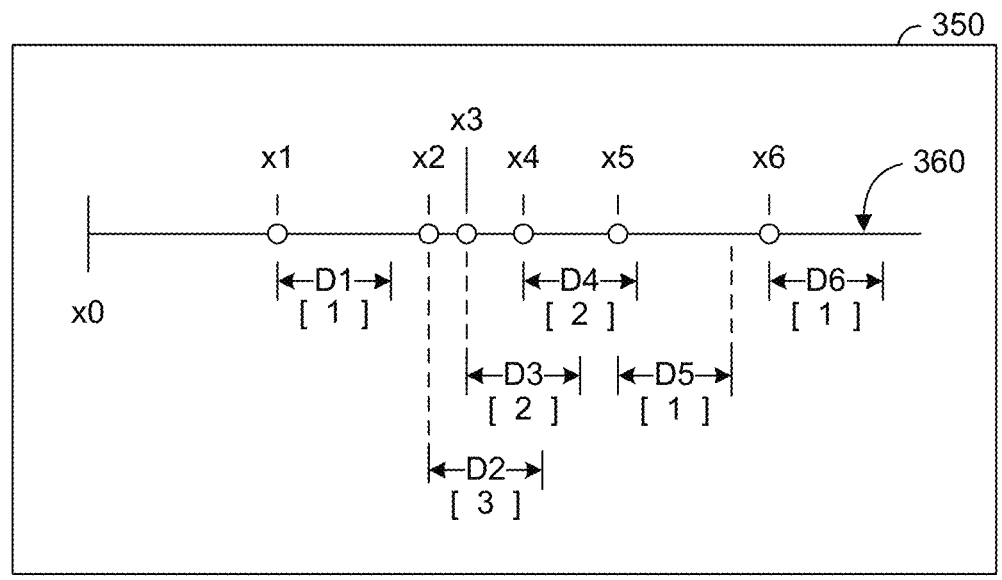
FIG. 3B is a graph illustrating processes performed to determine a focal configuration according to an embodiment.

FIG. 2 illustrates elements of a method 200 to determine a focal configuration of the lens system according to an embodiment. To illustrate certain features of various embodiments, method 200 is described herein with reference to an example scenario illustrated in FIGS. 3A, 3B. FIG. 3A shows a top side view of an environment 300 in which an image sensor device 310 is to operate according to an embodiment. FIG. 3B shows a view 350 of various distances, as projected onto a single line 360, from image sensor device 310 to respective objects in environment 300. Method 200 may be performed with one or more components of image sensor device 310—e.g., wherein image sensor device 310 includes some or all features of system 100. However, other embodiments include method 200 being performed by any of a variety of other image sensor devices having features described herein.

In one embodiment, method 200 includes, at 210, identifying respective distances to each of a plurality of objects in a field of view of a lens system. For example, as shown in FIG. 3A, image sensor device 310 may be positioned (located and oriented) such that some multiple objects, such as the illustrative six objects A through F shown, are each in field of view 320 (e.g., between lines of sight 322, 324) that is observable through a lens system 312 of image sensor device 310. The objects A through F are not limiting one some embodiments, and image sensor device 310 may be configured to perform method 200 based on more, fewer and/or differently arranged objects.

Positions of objects in field of view 320 may be identified at least in part with reference, for example, to a polar coordinate system (e.g., part of a cylindrical or spherical coordinate system) comprising a distance dimension x and a radial dimension θ. In the illustrative scenario shown, field of view 320 has located therein object A at location (x1, θ4), object B at location (x2, θ3), object C at location (x3, θ2), object D at location (x4, θ5), object E at location (x5, θ6) and object F at location (x6, θ1). In the example scenario shown in FIG. 3A, objects A through F are each in a two-dimensional plane. However, it will be appreciated that some or all such objects may be variously located at different vertical heights in a three-dimensional space—e.g., where the vertical height component of an object's location may result in some additional distance between the object and image sensor 310. The determining at 210 may include, for example, identifying the distances x1, x2, x3, x4, x5, x6—e.g., where such identifying is performed with distance evaluation circuitry 150 based on signals 142.

Method 200 may further comprise performing a first determination of a focal configuration to be implemented (with lens system 312, in the example of FIG. 3A). Such determining, also referred to herein as a "first focus determination" for brevity, may determine a focus of the lens system—e.g., including operations to provide a comparative evaluation of at least two focal configurations based on respective counts of in-focus objects. For example, the first focus determination may include, at 220, determining a first count of any of the plurality of objects to be in focus, while a first object of the plurality of objects is at a first near depth of field, due to a first focal configuration of the lens system and to a first aperture (i.e., a particular aperture size which may be fixed or, alternatively, adjustable). The first count may represent a first total number of any of the plurality of objects that would appear in focus if observed with the lens system while the first field of focus is implemented with both the first focal configuration and the first aperture.

The first focus determination may further comprise, at 230, determining a second count of any of the plurality of objects to be in focus, while a second object of the plurality of objects is at a second near depth of field, due to a second focal configuration and to the first aperture. The second count may represent a second total number of any of the plurality of objects that would appear in focus if observed with the lens system while the second field of focus is implemented with a second focal configuration of the lens system and with the first aperture. The determining at 230 may include counting a total number of objects of a second in-focus object set which corresponds to the second focal configuration.

FIG. 3B illustrates one example of a focal configuration determination (such as that including the determining at 220 and 230) which comprises counting, for each of a plurality of focal configurations, a respective counts of objects of an in-focus object set which corresponds to that focal configuration. Such a count (referred to herein as an "in-focus object count") may include setting a near depth of field variable to be equal to a distance of a particular object distance, and calculating or otherwise determining a far depth of field value that corresponds to—e.g., is to be concurrent with—the near depth of field value. The distances identified at 210 may then be evaluated to determine which objects are between the near depth of field and the corresponding far depth of field.

For example, as shown in view 350, a focal configuration determination may perform a first in-focus object count for a field of focus D1 wherein a near depth of field of D1 is to be at the same distance (x1-x0) from image sensor 310 as is object A. The first in-focus object count may determine that only one of the objects A through F—i.e., object A—is (or would be) in focus when lens system 312 has a first focal configuration to facilitate D1. A second in-focus object count may be performed for a field of focus D2 wherein a near depth of field of D2 is to be at the same distance (x2-x0) from image sensor 310 as is object B. The second in-focus object count may determine that a total of three of the objects—i.e., objects B, C and D—are or would be in focus when lens system 312 has a second focal configuration to facilitate D2.

The focal configuration determination may further perform a third in-focus object count for a field of focus D3 wherein a near depth of field of D3 is to be at the same distance (x3-x0) from image sensor 310 as is object C. The third in-focus object count may determine that a total of two of the objects—i.e., objects C and D—are or would be in focus when lens system 312 has a third focal configuration to facilitate D3. A fourth in-focus object count may be performed for a field of focus D4 wherein a near depth of field of D4 is to be at the same distance (x4-x0) from image sensor 310 as is object D. The fourth in-focus object count may determine that a total of two of the objects—i.e., objects D and E—are or would be in focus when lens system 312 has a fourth focal configuration to facilitate D4.

The focal configuration determination may further perform a fifth in-focus object count for a field of focus D5 wherein a near depth of field of D5 is to be at the same distance (x5-x0) from image sensor 310 as is object E. The fifth in-focus object count may determine that only one object—i.e., object E—is or would be in focus when lens system 312 has a fifth focal configuration to facilitate D5. A sixth in-focus object count may be performed for a field of focus D6 wherein a near depth of field of D6 is to be at the same distance (x6-x0) from image sensor 310 as is object F. The sixth in-focus object count may determine that only one object—i.e., object F—is or would be in focus when lens system 312 has a sixth focal configuration to facilitate D6. The respective depths of field of D1-D6 may be substantially equal—e.g., within 10% of each other and, in some embodiments, within 5% of each other.

The focal configuration determination performed by method 200 may further comprise, at 240, performing a comparison of a first score based on the first count determined at 220 and a second score based on the second count determined at 230. For example, the first score and the second score may be equal to the first count and the second count, respectively. In another embodiment, a score may be based at least in part on a weighted value that has been assigned to an object in the field of view. The assignment of such a weighted value may be based, for example, on a location of the object in question in the field of view. By way of illustration and not limitation, a weight value may be assigned to an object based at least in part on a location of the object relative to a reference point or a reference line (e.g., a center, a midline, an edge and/or a corner) of the field of view. Alternatively or in addition, such a weight value may be assigned to the object based at least in part on its position in the field of view relative to one or more other objects that are also in the field of view. Such a weight value may additionally or alternatively be assigned based at least in part on an object class type that has been identified, by image recognition processing, as corresponding to the object.

Based on a result of the comparison performed at 240, method 200 may further comprise, at 250, providing a signal indicating a preference between the first focal configuration or the second focal configuration. For example, the signal may specify or otherwise indicate that the first focal configuration is to be preferred over the second focal configuration. The signal provided at 250 may indicate that the first field of focus, to be provided with the first focal configuration, is to result in a larger number of—and/or a better weighted score for—in-focus objects, as compared to a second field of focus that might otherwise be provided by the second focal configuration.

Referring again to the example scenario shown in FIG. 3B, the signal at 250 may indicate a preference for the focal configuration that facilitates D2 over the focal configuration that facilitates D1. Such a signal may identify the focal configuration that, of a plurality of such configurations, is to result in the largest number of in-focus objects. In some embodiments, the signal provided at 250 may be generated independent of any count of objects that are to be in focus while each of the plurality of objects is offset from a near depth of field—e.g., independent of any determining of an in-focus object count which corresponds to a focal configuration other than one that is to place one of the plurality of objects at a near depth of field. For example, a focal configuration determination performed for objects A through F in field of view 320 may include performing only six in-focus object counts—i.e., each for a respective one of the fields of focus D1 through D6 shown.

Conventional techniques to determine lens focusing variously sweep across a range of focal distances, performing respective calculations for each of a large set of fields of focus. This larger set typically includes many fields of focus for which no identified object is (or would be) located at the near depth of field. By contrast, some embodiments calculate scores for a relatively smaller, more particular set of fields of focus—e.g., the total number of which may be not more than a total number of the plurality of objects. The comparative evaluation of only D1 through D6—e.g., without also evaluating many other intermediate fields of focus each between respective ones of D1 through D6—illustrates one efficiency obtained by many such embodiments. As compared to conventional techniques, such embodiments are more efficient by providing relatively simpler, and thus faster, processing to evaluate fields of focus.

Although some embodiments are not limited in this regard, method 200 may comprise one or more additional operations (not shown) to operate an image sensor device based on the signal provided at 250. For example, method 200 may further comprise configuring the lens system based on the signal provided at 250—e.g., wherein the lens system is to implement the first configuration to locate at a near depth of field the first object. In such an embodiment, an object other than the first object may be a closest object (of all of the plurality of objects) to the lens array. After configuring the lens system, method 200 may further operate a pixel array to capture an image received with the lens system. Although some embodiments are not limited in this regard, method 200 may be repeated one or more times—e.g., including selection circuitry 160 (for example) performing one or more additional focus determinations of a plurality of focus determinations including the first focus determination. For example, some or all of such a plurality of focus determinations may each correspond to a different respective aperture that is to operate with the lens system.

Figure 4:
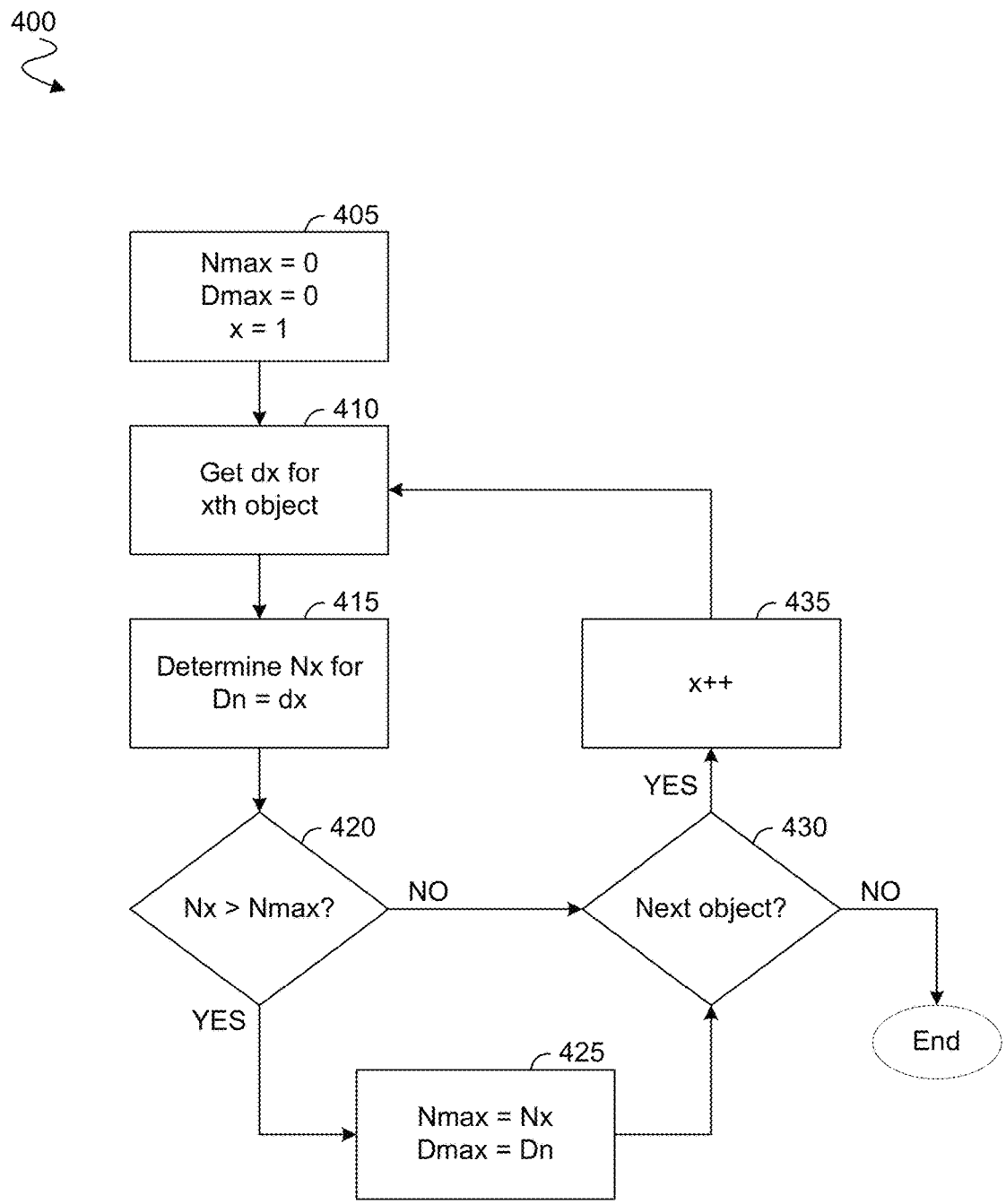
FIG. 4 is a flow diagram illustrating elements of a process to determine a focal configuration according to an embodiment.

FIG. 4 illustrates elements of a method 400 to determine a focal configuration according to an embodiment. Method 200 may be performed with system 100 or image sensor device 310, for example. In an embodiment, method 200 includes some or all of the features of method 200.

In the illustrative embodiment shown, method 400 includes operations to initialize variables used in determining a preferred focal configuration. By way of illustration and not limitation, such operations may include, at 405, setting to zero each of a variable Dmax representing a currently preferred near field of focus and another variable Nmax representing an in-focus object count corresponding to Dmax. The operations at 405 may additionally or alternatively include setting a counter variable x to an initial value—e.g., one (1).

Method 400 may further comprise, at 410, determining a distance dx of the xth object (where xth is an ordinal corresponding to a current value of variable x) of a plurality of objects that have been determined to be within a field of view that is observable via a lens system. The distance dx may be determined with respect to a reference location such as a center point in or on a lens of the lens system. At 415, method 400 may determine a value Nx representing an in-focus object count—i.e., a count of objects that are (or would be) in-focus while the lens system has a focal configuration that puts the xth object at a near field of focus. The determining at 415 may include one or more operations such as those of the determining at 220 or the determining at 230, for example.

Method 400 may further include determining, at 420, whether the value Nx most recently determined at 415 is greater than a current value of Nmax. Where it is determined at 420 that Nmax is greater than the current Nmax value, method 400 may perform operations, at 425, including setting Nmax to be equal to the most recently determined value of Nx. The operations at 425 may further comprise setting Dmax to be equal to the most recently determined value of Dn. Subsequently, a determination may be made, at 430, as to whether any other object of the plurality of objects remain to be addressed by method 400. Where it is instead determined at 420 that Nmax is less than (or equal to, in some embodiments) the current Nmax value, method 400 may forego an instance of the operations at 425, and proceed to the determining at 430.

In response to a determination at 430 that each of the plurality of objects have been addressed, method 400 may proceed to, or be followed by, subsequent operations (not shown) to implement at the lens system a focal configuration that provides a near depth of field equal to the most recent value of Dmax. Where it is instead determined at 430 that at least one of the plurality of objects has not been addressed, method 400 may increment the counter x, at 435, and proceed to perform (for the newly incremented value of x) another instance of the determining at 410.

In one embodiment, the initial xth object—i.e., a first object—of the plurality of objects to be addressed by method 400 is a closest object of the plurality of objects to the lens system. Each next xth object to be addressed by method 400 may, for example, be a next object further away from the lens system. In such an embodiment, one or more additional test conditions (not shown) may be evaluated to determine whether an exit from method 400 is to be performed.

By way of illustration and not limitation, an early exit from method 400 may be performed in response to a determination—e.g., at 420—that Nx represents the xth object and all other objects (of the plurality of objects) that are further away from the lens system than the xth object. Alternatively or in addition, an early exit from method 400 may be performed in response to a determination—e.g., at 420—that any subsequent evaluation of Nx could not be larger than the current value of Nmax (e.g., where method 400 is to address objects successively according to the increasing order of their respective distances from the lens system).

Figure 5:
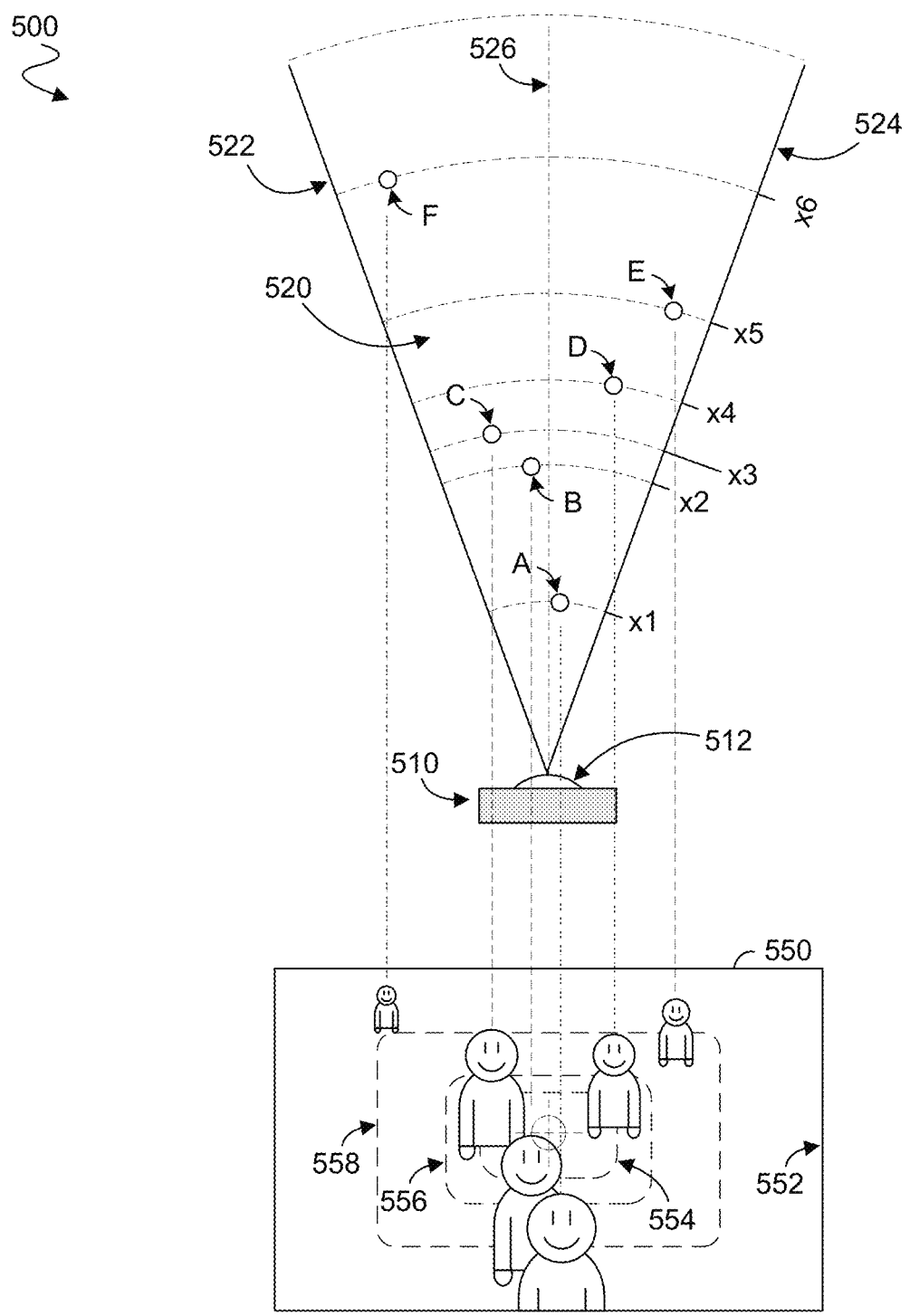
FIG. 5 shows various views illustrating features of an environment in which an image sensor device is to provide auto-focus capability according to an embodiment.

FIG. 5 illustrates features of an embodiment wherein a focal configuration of a lens system is determined based on respective scores for objects in a field of view, wherein the scores are in turn determined based on different weight values assigned to various ones of the objects. Such determining may be performed, for example, by one system 100 or image sensor device 310—e.g., according to one of methods 200, 400.

FIG. 5 shows a top side view of an environment 500 in which an image sensor device 510 is to operate according to an embodiment. As shown in FIG. 5, image sensor device 510 may be positioned (located and oriented) such that objects—e.g., the illustrative plurality of objects A through F shown—are each in field of view 520, between lines of sight 522, 524, that is observable through a lens system 512 of image sensor device 510. Image sensor device 510 may be positioned to additionally or alternatively image more, fewer and/or differently arranged objects, in various embodiments.

FIG. 5B shows one example view 550 of objects A through F (being people, in the illustrative scenario) that are within field of view 520, the view 550 as seen through lens system 512. A focal configuration for lens system 512 may be determined, for example, based in part the respective distances x1 though x6 of objects A through F from lens system 512. In some embodiments, such determining of a focal configuration may be further based on respective locations of some or all of objects A through F in view 550.

For example, preprogrammed reference information—e.g., stored in memory 130—may correspond different regions of view 550 each with a respective value indicating a degree of value placed on objects in that region. In the illustrative embodiment shown, such regions include a region 554 in which is located a center of view 550 (the center aligned with centerline 526 of field of view 520). The regions may further include a region 556 adjoining, and extending around, region 554, as well as another region 558 adjoining, and extending around, region 556. Still another region around 558 may extend to an edge 552 of view 550.

For a given one of such regions, an object identified as being in the region may be assigned a weight which is equal to or otherwise based on the predefined preference value associated with that region. In the illustrative embodiment shown, object A may be assigned a first weight corresponding to region 554, and objects B, C and D may each be assigned a second weight corresponding to region 558. Objects E and F may each be assigned a third weight corresponding to the region which adjoins and surrounds region 558.

A score $S_x$ may be calculated a given focal configuration Cx of lens system 512—e.g., where Cx provides a near depth of field that is equal to the distance of the xth object of the plurality of objects from lens system 512. In one embodiment, a $S_x$ value may be calculated according to the following:

$$S_x = \sum_{i=1}^{I} (B_{ix})(W_i) \quad (6)$$

wherein I is an integer equal to a total number of the plurality of objects, $B_{ix}$ is a Boolean value that is equal to "1" if the ith object is or would be in focus during Cx (and equal to "0" otherwise), and $W_i$ is a weight value associated with the region of view 550 in which the ith object is located. In some other embodiments, a given weight value $W_i$ may be additionally or alternatively determined based on an object type to which a corresponding ith object belongs. By way of illustration and not limitation, a weight value $W_i$ may be relatively more significant where image recognition processing has identified the corresponding ith object as being one instance of a human face (or portion thereof) object type. The assigning of particular weights to respective objects may be based on any of a wide variety of possible object type preferences that are preprogrammed or otherwise determined in advance—e.g., by a manufacturer, retailer, user or other agent. In one illustrative embodiment, a relatively more significant (e.g., larger value) weight may be assigned to objects of a human face object type, as compared to one or more alternative object types. However, the techniques by which such preferences are to be determined may depend upon implementation-specific details, and may not be limiting on some embodiments. As contrasted with an in-focus object count, a $S_x$ value (or a $W_i$ value) may be a number other than any integer, for example. Equation (6) is merely one example calculation for determining $S_x$ for a given xth object. Any of a variety of other calculations to determine a $S_x$ value may be performed, according to different embodiments.

Some embodiments may calculate respective $S_x$ values for two or more of—e.g., each of—the I objects that are identified as being located in field of view 520. Lens system 512 may be subsequently configured based on such an evaluation of such scores. For example, a focal configuration of lens system 512 may be implemented based on that focal configuration having a greatest $S_x$ value. In some scenarios, two or more focal configurations may each have the same $S_x$ value—e.g., where that $S_x$ value is greater than any of the other calculated $S_x$ values. In such an embodiment, one of such two of more focal configurations may be selected for implementation based on that focal configuration having a shortest focal distance, as compared to the others of the two of more focal configurations.

Techniques and architectures for operating an optical device are described herein. Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A device comprising:
   a lens system to receive light from an environment external to the device;
   distance evaluation circuitry configured to identify respective distances to each of a plurality of objects including a first object and a second object;
   selection circuitry coupled to the distance evaluation circuitry to determine a focus of the lens system, the selection circuitry including logic that when executed causes the device to perform operations including:
      adjusting the lens system to have a first focal configuration and a first aperture in which the first object is at a first near depth of field;
      determining a first count of any of the plurality of objects to be in focus, while the first object is at the first near depth of field, due to the first focal configuration and to the first aperture, wherein the first count represents a number of objects in focus while the first object is at the first near depth of field;
      adjusting the lens system to have a second focal configuration and the first aperture in which the second object is at a second near depth of field;
      determining a second count of any of the plurality of objects to be in focus, while the second object is at the second near depth of field, due to the second focal configuration and to the first aperture, wherein the second count represents a number of objects in focus while the second object is at the second near depth of field;
      comparing a first score based on the first count that results from the first focal configuration and a second score based on the second count that results from the second focal configuration, to identify a preference between the first focal configuration and the second focal configuration based on which focal configuration provides a larger number of in-focus objects; and
      providing, based on the comparing of the first score and the second score, a signal which indicates the preference between the first focal configuration and the second focal configuration based on which focal configuration provides a larger number of in-focus objects;
   a focus controller coupled to adjust the lens system based on the signal; and
   an image sensor optically coupled to capture an image received with the lens system after the lens system has been adjusted based on the signal.

2. The device of claim 1, wherein the selection circuitry is configured to cause the device to generate the signal which indicates the preference between the first focal configuration and the second focal configuration independent of the device performing any count of objects being in focus while all of the plurality of objects are offset from a near depth of field for a present focal configuration.

3. The device of claim 1, wherein the selection circuitry is configured to cause the device to determine one or more other focuses of the lens system, each of the one or more of the other focuses due in part to a respective aperture other than the first aperture.

4. The device of claim 1, wherein the signal indicates the preference for the first focal configuration, and an object other than the first object, of the plurality of objects, is a closest object to the lens array while the lens system has the first focal configuration.

5. The device of claim 1, wherein the selection circuitry is configured to cause the device to calculate the first score based on a first weight value assigned to an object based on a location of the object in the field of view.

6. The device of claim 5, wherein the location of the object in the field of view is relative to a reference point or a reference line of the field of view.

7. The device of claim 6, wherein the reference point is a center of the field of view.

8. The device of claim 5, wherein the location of the object in the field of view is relative to another object of the plurality of objects.

9. The device of claim 5, wherein the first score includes a number other than any integer.

10. The device of claim 1, wherein selection circuitry is configured to cause the device to calculate the first score based on a first weight value assigned to an object based on an object type of the object.

11. The device of claim 10, wherein the object type includes a human face object type.

12. A non-transitory computer-readable storage medium having stored thereon instructions which, when executed by one or more processing units, cause the one or more processing units to perform a method comprising:
   identifying respective distances to each of a plurality of objects in a field of view of a lens system, the plurality of objects including a first object and a second object;
   determining a focus of the lens system, including:
      adjusting the lens system to have a first focal configuration and a first aperture in which the first object is at a first near depth of field;
      determining a first count of any of the plurality of objects to be in focus, while the first object is at the first near depth of field, due to the first focal configuration and to the first aperture, wherein the first count represents a number of objects in focus while the first object is at the first near depth of field;

adjusting the lens system to have a second focal configuration and the first aperture in which the second object is at a second near depth of field;

determining a second count of any of the plurality of objects to be in focus, while the second object is at the second near depth of field, due to the second focal configuration and to the first aperture, wherein the second count represents a number of objects in focus while the second object is at the second near depth of field;

comparing a first score based on the first count that results from the first focal configuration and a second score based on the second count that results from the second focal configuration, to identify a preference between the first focal configuration and the second focal configuration based on which focal configuration provides a larger number of in-focus objects; and providing, based on the comparing of the first score and the second score, a signal which indicates the preference between the first focal configuration and the second focal configuration based on which focal configuration provides a larger number of in-focus objects;

adjusting the lens system based on the signal; and capturing an image received with the lens system after the lens system has been adjusted based on the signal.

13. The non-transitory computer-readable storage medium of claim 12, wherein the signal which indicates the preference between the first focal configuration and the second focal configuration is generated independent of performing any count of objects being in focus while all of the plurality of objects are offset from a near depth of field for a present focal configuration.

14. The non-transitory computer-readable storage medium of claim 12, the method further comprising determining one or more other focuses of the lens system, each of the one or more of the other focuses due in part to a respective aperture other than the first aperture.

15. The non-transitory computer-readable storage medium of claim 12, wherein the signal indicates the preference for the first focal configuration, and an object other than the first object, of the plurality of objects, is a closest object to the lens array while the lens system has the first focal configuration.

16. The non-transitory computer-readable storage medium of claim 12, the method further including calculating the first score based on a first weight value assigned to an object based on a location of the object in the field of view.

17. The non-transitory computer-readable storage medium of claim 16, wherein the location of the object in the field of view is relative to a reference point or a reference line of the field of view.

18. The non-transitory computer-readable storage medium of claim 16, wherein the location of the object in the field of view of relative to another object of the plurality of objects.

19. A method comprising:
identifying respective distances to each of a plurality of objects in a field of view of a lens system, the plurality of objects including a first object and a second object;

determining a focus of the lens system, including:
adjusting the lens system to have a first focal configuration and a first aperture in which the first object is at a first near depth of field;

determining a first count of any of the plurality of objects to be in focus, while the first object is at the first near depth of field, due to the first focal configuration and to the first aperture, wherein the first count represents a number of objects in focus while the first object is at the first near depth of field;

adjusting the lens system to have a second focal configuration and the first aperture in which the second object is at a second near depth of field;

determining a second count of any of the plurality of objects to be in focus, while the second object is at the second near depth of field, due to the second focal configuration and to the first aperture, wherein the second count represents a number of objects in focus while the second object is at the second near depth of field;

comparing a first score based on the first count that results from the first focal configuration and a second score based on the second count that results from the second focal configuration, to identify a preference between the first focal configuration and the second focal configuration based on which focal configuration provides a larger number of in-focus objects; and providing, based on the comparing of the first score and the second score, a signal which indicates the preference between the first focal configuration and the second focal configuration based on which focal configuration provides a larger number of in-focus objects;

adjusting the lens system based on the signal; and capturing an image received with the lens system after the lens system has been adjusted based on the signal.

20. The method of claim 19, wherein the signal which indicates the preference between the first focal configuration and the second focal configuration is generated independent of performing any count of objects being in focus while all of the plurality of objects are offset from a near depth of field for a present focal configuration.

21. The method of claim 19, wherein the signal indicates the preference for the first focal configuration, and an object other than the first object, of the plurality of objects, is a closest object to the lens array while the lens system has the first focal configuration.

22. The method of claim 19, further including calculating the first score based on a first weight value assigned to an object based on a location of the object in the field of view.

* * * * *